Patented Apr. 22, 1924.

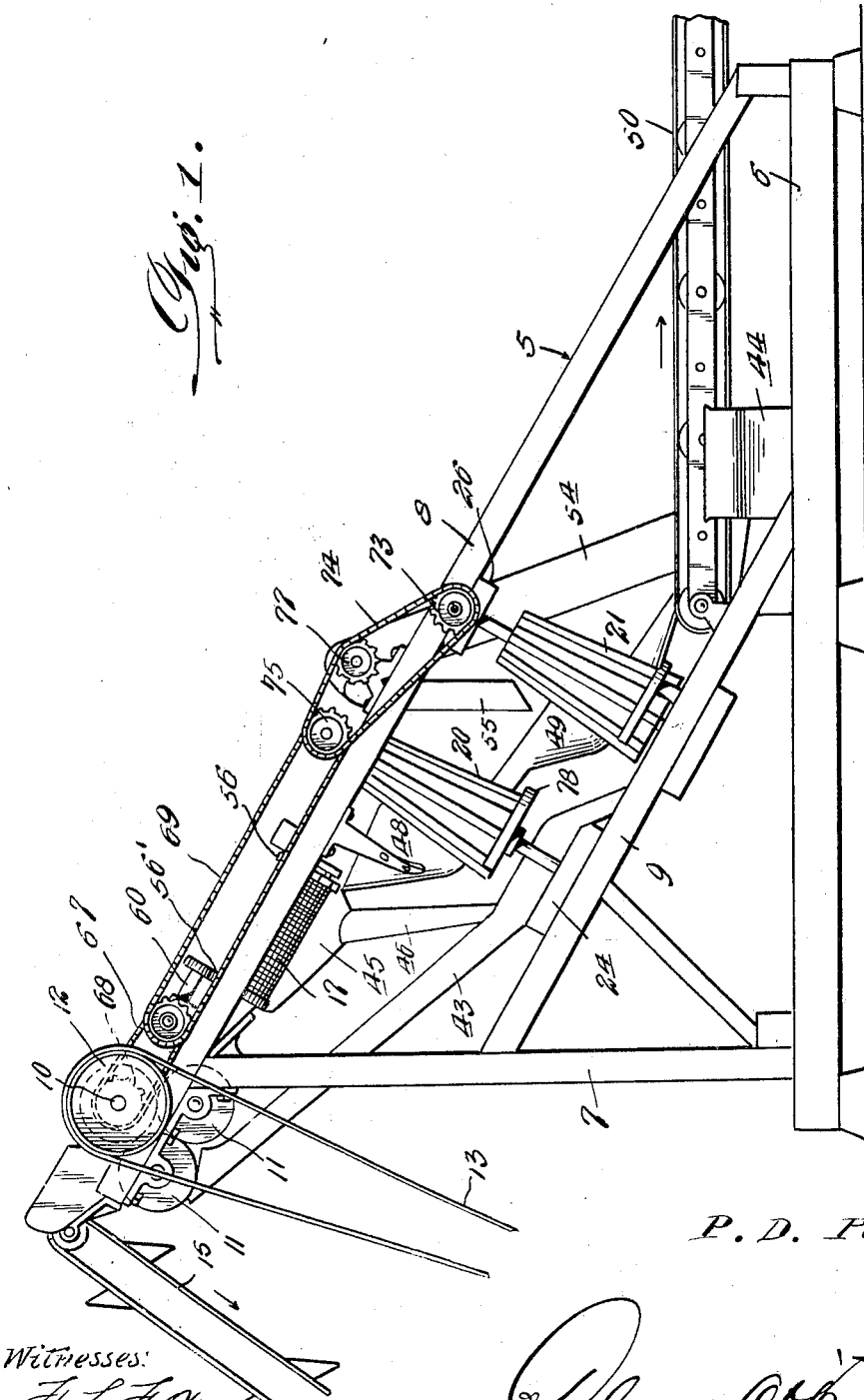

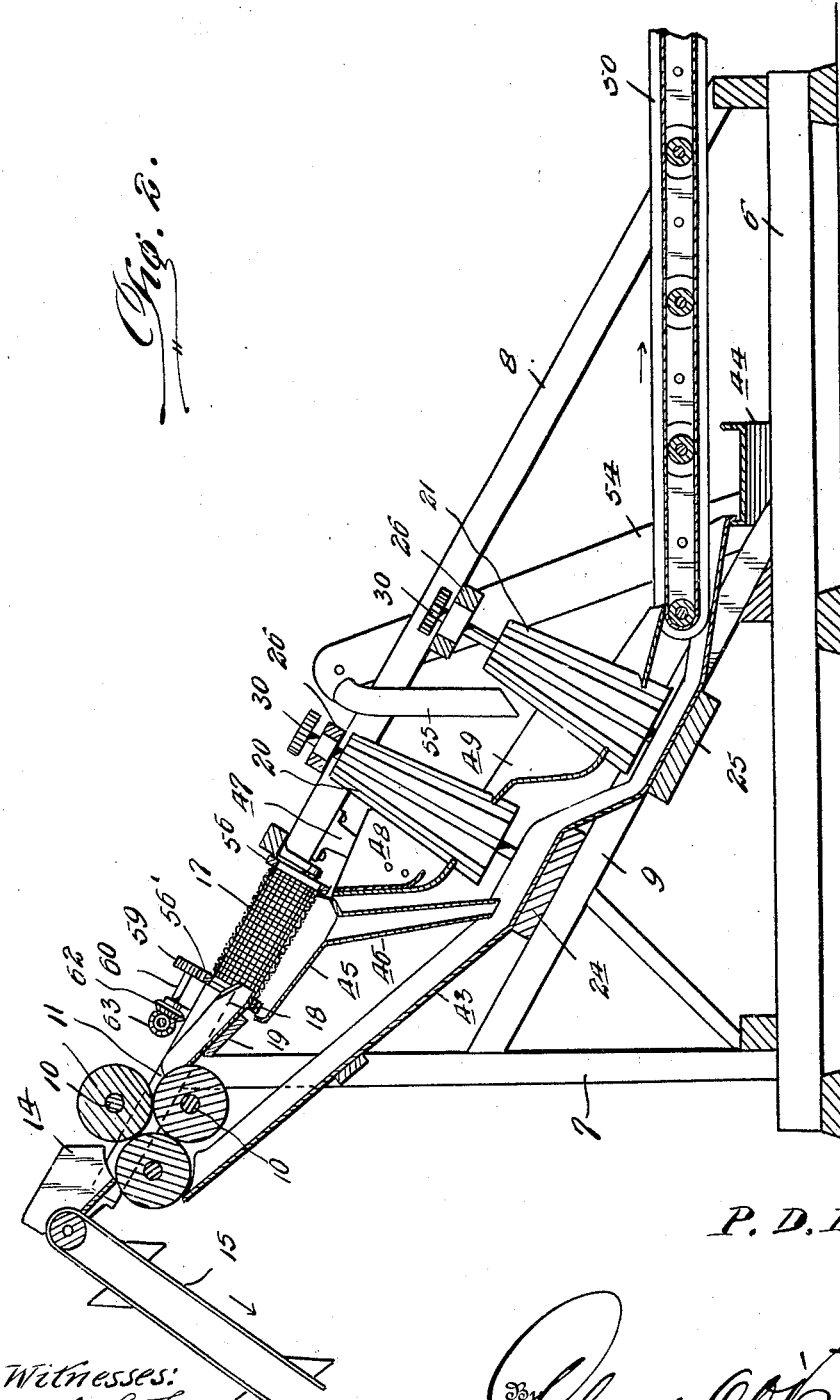

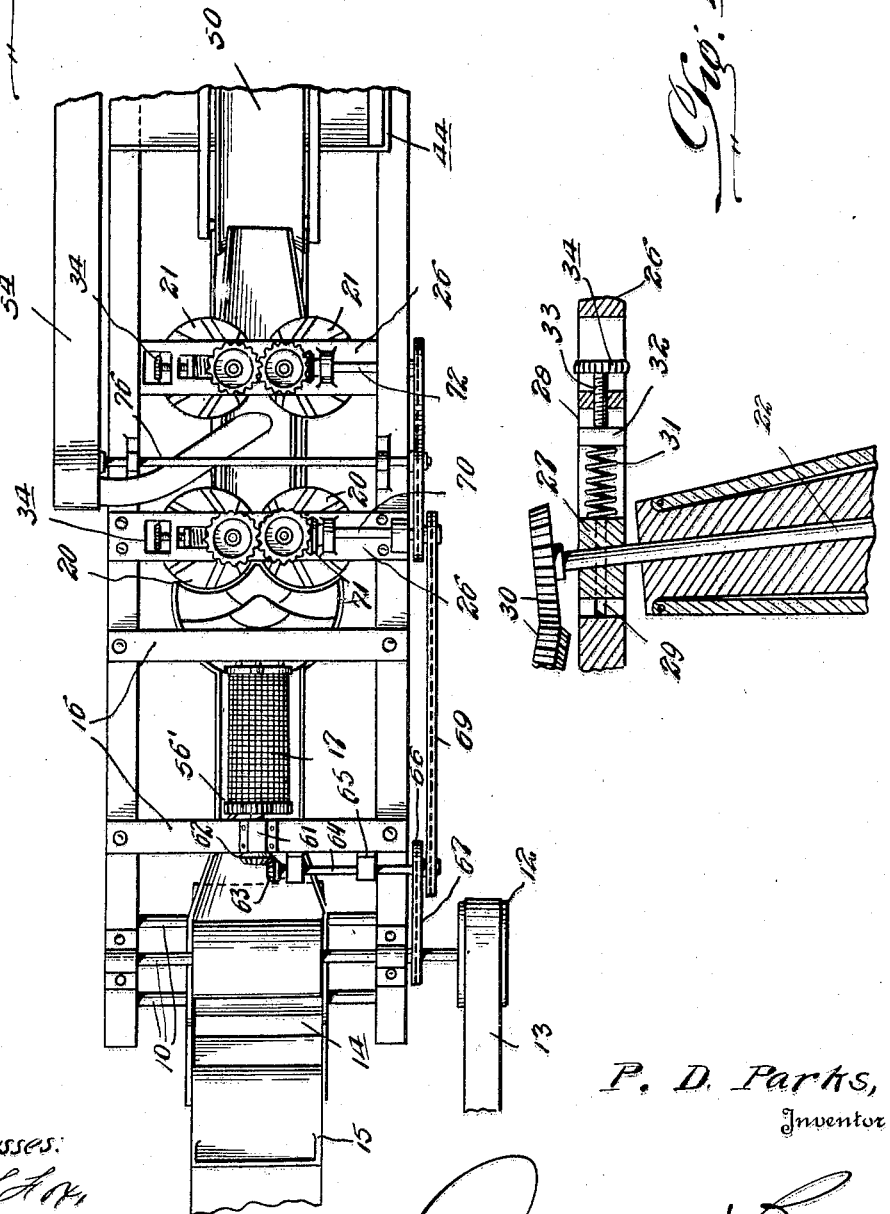

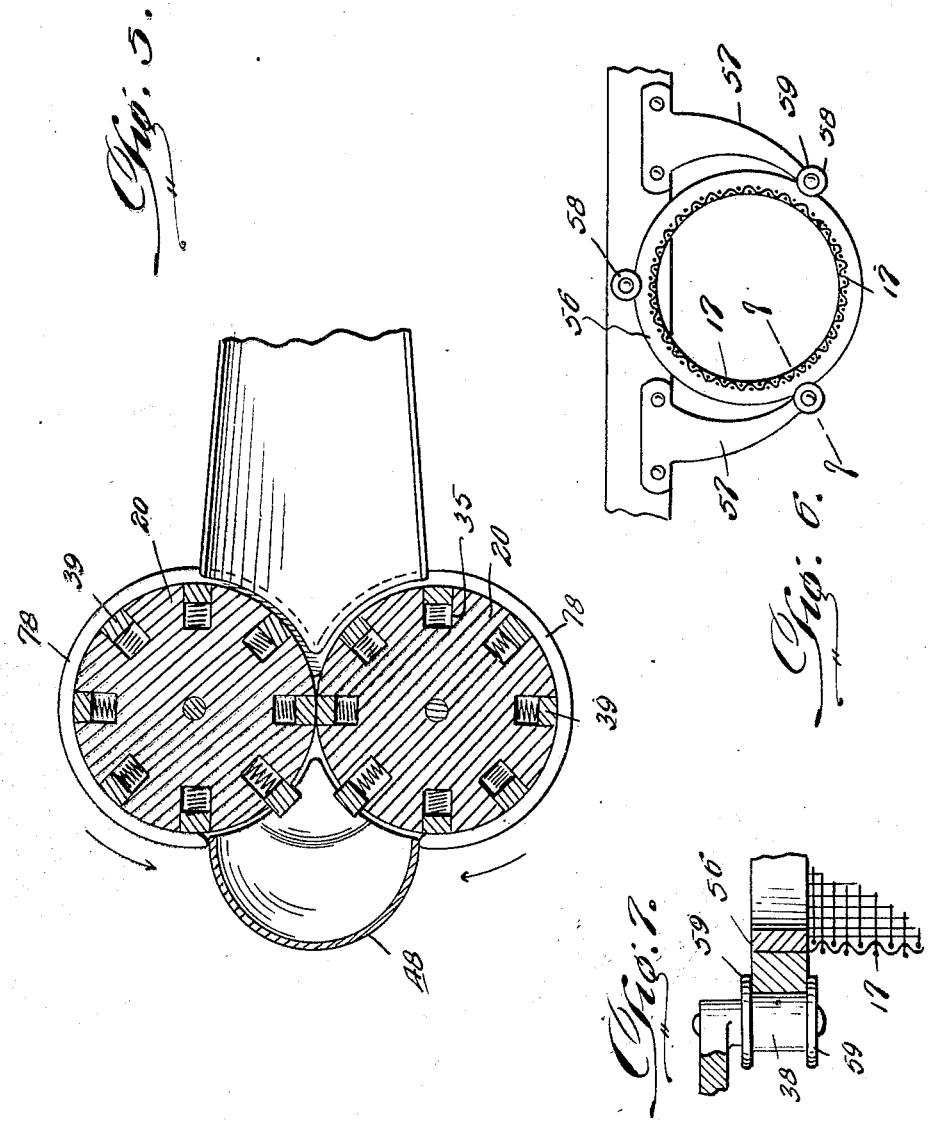

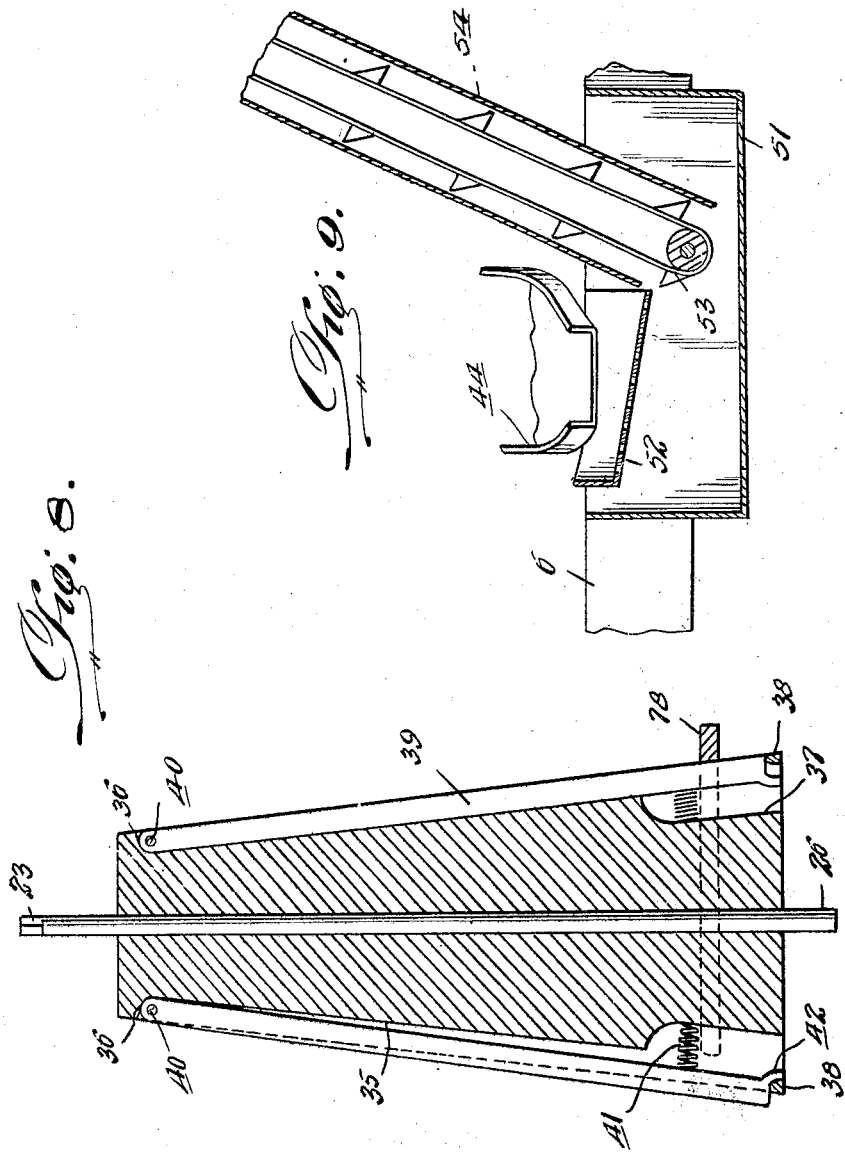

1,491,061

UNITED STATES PATENT OFFICE.

PERRY D. PARKS, OF FRESNO, OHIO.

FRUIT PRESS.

Application filed February 17, 1923. Serial No. 619,631.

*To all whom it may concern:*

Be it known that I, PERRY D. PARKS, a citizen of the United States, residing at Fresno, in the county of Coshocton and State of Ohio, have invented certain new and useful Improvements in Fruit Presses, of which the following is a specification.

The primary object of the invention is the provision of a fruit press that is adapted for pressing apples in the manufacture of cider, although the press is well adapted for pressing fruit other than apples.

A further object of the invention resides in the provision of such a press that is a great improvement over the hydraulic and screw presses, with which I am now familiar.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:

Figure 1 is a side elevational view of a press constructed in accordance with my invention.

Figure 2 is a vertical longitudinal cross sectional view of the same.

Figure 3 is a fragmentary top plan view thereof.

Figure 4 is an enlarged fragmentary cross sectional view of one of the pressing rollers employed in conjunction with this invention.

Figure 5 is a longitudinal transverse cross sectional view of one of the pairs of pressing rollers employed in conjunction with the invention.

Figure 6 is an enlarged cross sectional view through the cylindrical strainer member which forms a part of my invention.

Figure 7 is a cross sectional view upon the line 7—7 of Figure 6.

Figure 8 is an enlarged vertical transverse cross sectional view of one of the pressing rollers per se, and Figure 9 is an enlarged fragmentary cross sectional view of a portion of my improved fruit press.

Referring to the drawings in detail, 5 designates the frame of the press, which is inclined substantially as shown in the drawings. This frame constitutes generally, a pair of lower horizontal frame bars 6, vertical members 7 secured adjacent the rear end of the bars 6, upper rearwardly inclined frame bars 8 and intermediate similarly inclined frame bars 9.

Between the upper ends of the top frame bars 8 are journaled transverse roller shafts 10, each of which carries a crushing roll 11. These shafts as well as the rolls are preferably three in number and arranged in substantially the manner shown in Figures 1, 2 and 3. The rolls upon these shafts are in close contact with each other, and the shaft of the central roll has one end extending outwardly of the adjacent frame bar 8 and has a pulley 12 keyed thereon over which is trained a belt 13. This belt is in turn trained over a pulley upon the power shaft of any suitable engine, which however, is not of the essence of my invention, and therefore not shown.

Communicating with these crushing rolls 11, is one end of a chute 14, the opposite end thereof having communication with the upper end of a desirable form of endless, inclined elevator 15. This elevator is for the purpose of conveying the apples or other fruit upward to the crushing roll 11.

Forwardly of these rolls, and journaled centrally between a pair of cross arms 16 which are secured at their opposite ends to the inclined frame bars 8 is a rotary strainer member 17, which is in the form of an open ended cylinder of mesh wire or other foraminous material. The crushed apples are guided from the rolls 11 to the strainer 17 through the instrumentality of a chute 18, which is suitably supported at 19 between the said frame bars 8.

Forwardly of the outlet end of this strainer 17 are pairs of spaced pressing rollers designated at 20 and 21 respectively. Each roller is conical shape as more clearly shown in Figure 8, and carries a central vertical shaft 22, the ends of which project outwardly of the rollers and are squared as at 23 upon their front ends. The lower ends of each pair of shafts are journaled in cross members 24 and 25 respectively, which cross members are carried by the said intermediate bars 9 of the press frame 5. The upper end of each outer shaft 22 of the pairs of rollers are journaled in transverse cross bars 26, while the inner shaft of each pair of rollers are journaled in blocks 27, Figure 4, which blocks are slidably disposed in slots 28 on the said cross bars 26. The sides of each of these blocks are tongued for fitting in guide channels 29 upon the sides of the said slots 28 of the cross bars. Upon the squared ends 23 of each of the lower shafts 22 are bevelled gears 30, the gears of each pair of roller shafts normally intermeshing with each other, through the instrumentality of a coiled spring 31, between one end of each of the blocks 27 and a sliding plate 32, these sliding plates being disposed within the said slots 28 of the cross arms 26. The tension of each of these springs may be increased or diminished through the instrumentality of a screw threaded bolt 33, one end of which has contact with its cooperating sliding plate 32, the opposite end thereof being formed with a thumb wheel 34.

The construction of the rollers of each pair 20 and 21 are of identical construction, and therefore a description of one will suffice for all. As more clearly shown in Figures 5 and 8, and as above pointed out, these rollers are conical shaped. The same are formed around their periphery with spaced vertical channels 35, the upper ends of which terminate inwardly of the upper end of each of the rollers for providing what may be termed shoulders 36. The lower ends of each of the channels are incut for forming pockets 37, forwardly of the lower ends of which are abutments 38. Within each of the said channels 35, and of a length equivalent to the length of the channels are rod 39, the upper ends thereof being pivoted as at 40 within the upper ends of the channels. Springs 41 are disposed within each of the pockets 37 for normally swinging the said rods outwardly of their respective channel, the outward movement of the rods being limited by pendent tongues 42 upon the lower end of each rod engaging the said abutments 38 of the rollers.

Suitably supported by the frame 5 and extending beneath the crushing rolls 11, the strainer 17 and pairs of rolls 20 and 21 respectively, is a trough 43, the lower front end of which has communication with an inclined trough 44 transversely supported between the lower longitudinal frame bars 6 of the said frame 5. It is to be understood that the width of the trough 43 is such as to permit the same to be extended between the shafts 22 of each pair of pressing rollers 20 and 21 as shown in Figures 1 and 2.

Beneath the cylindrical strainer 17 is a pan-shaped trough or hopper 45, the front end of which is formed with a pendent discharge spout 46 for the purpose of conveying the fruit juices from the trough 45 to the trough 43. Beneath the outlet end of this strainer 17 and supported from the inclined portion 8 of the frame 5 by bracket arms 47, is a peculiarly shaped hopper 48, the front end of which is open, and of such a configuration as to permit the same to extend adjacent the pair of rollers 20 as in Figure 3. This hopper effectively catches the crushed fruit from the strainer 17, and permits the same to be pressed between the said pair of rollers. Further, an additional hopper or trough 49 is supported between the pairs of rollers 20 and 21 for conveying the crushed fruit from the rollers 20 to permit the same to be again pressed between the second pair of rollers 21. The fruit is finally conveyed to an endless platform 50 which carries the pulp to a suitable receptacle (not shown).

The outlet end of the inclined transversely positioned trough 44 communicates with a receptacle 51, Figure 9, which is secured to the outer side of the adjacent lower longitudinal frame bar 6. Within this receptacle, and directly beneath the outlet of the trough 44 is a pan 52, the bottom wall of which is inclined and perforated as shown. The lower end of this pan is open, and in communication with the lower end of a vertically disposed rearwardly inclined conveyor or elevator 53, which is disposed within a casing 54. The upper end of this casing is formed with an opening, within which is disposed a spout 55, the outlet end of which is directly rearwardly and substantially between the pair of rollers 21.

With specific reference to Figures 6 and 7 of the drawings, it will be seen that the outlet end of the cylindrical strainer 17 is surrounded by a metallic ring 56. Pendent arms 57 upon opposite sides of the strainer are secured at their upper ends to the adjacent cross strap or arm 16 hereinbefore described. The lower end of each of these arms carry a roller 58 having end flanges 59, the said ring 56 of the strainer being supported upon these rollers and engaging between the flanges 59 thereof. To prevent vertical movement of the strainer, there is positioned a similar roller 58 directly above the ring 56 and having close contact therewith. The journal or support for the inlet end of this cylindrical strainer 17, is similar in all respects to the journal or support for the end hereinabove described. However the ring 56' at this end of the strainer is in the form of a ring gear more clearly shown in Figures 1, 2 and 3. Meshing with this ring gear 56' is a spur gear 59, upon one end of a stub shaft 60, which is journaled at 61 upon the adjacent above mentioned cross arm 16 of the machine frame. The opposite end of this stub shaft 60 has keyed thereto a small bevelled gear 62 which is in turn in mesh with a relatively smaller bevelled gear 63 upon one end of a transversely disposed shaft 64, also suitably journaled as at 65 upon the said cross bar 16. The outer end of this shaft 64 carries a sprocket gear 66, over which is trained a sprocket chain 67, this chain extending rearwardly and being in turn trained over a sprocket gear 68 upon the roll shaft 10, which carries the pulley 12. Outwardly of the sprocket 66 upon the shaft 64 is another sprocket gear 68 over which is trained a sprocket chain 67. This last mentioned chain extends forwardly, and is in turn trained over a sprocket gear keyed upon one end of a shaft 70. This shaft 70 extends inwardly of the frame 5, and is journaled upon the cross arm 26 of the first mentioned pair of rollers 20, the inner end thereof carrying a bevelled gear 71, which intermeshes with the bevelled gear 30 upon the upper squared end of the adjacent roller shaft 22. Upon the cross arm 26 within which is journaled the upper ends of the shafts 22 of the front pair of rollers is a shaft 72 similar to the shaft 70, the inner end thereof also carrying a bevelled gear for mesh with the adjacent bevelled gear 30 of the adjacent roller shaft 22 of this pair of rollers, the outer end of this shaft carrying a sprocket gear 73, over which is trained a sprocket chain 74, which is in turn, trained over a sprocket gear 75 upon the first mentioned shaft 70.

Between the pairs of rollers 20 and 21 respectively and suitably journaled upon the inclined upper frame bars 8 of the press frame is a transversely disposed shaft 76, one end of which carries a sprocket gear 77 over which the said chain 74 is trained. The opposite end of this shaft 76 is extended within the casing 54 of the before mentioned inclined elevator 53, and is suitably, operatively connected therewith in any manner desirable, whereby this elevator may be actuated.

During the rotation of each pair of rollers 20 and 21 respectively, the pivoted rods 39 thereof, which are outwardly of or away from the open end of the hopper 49 are maintained within their respective channels by curved guide straps 78 engaging around the major portion of the rollers, as more clearly shown in Figure 5. The guide strap 78 for each pair of rollers consists of a single length of material bent into substantially the form shown in this figure.

In the operation of my improved press, the apples are conveyed upwardly to the crushing rolls 11 through the instrumentality of the conveyor 11. These apples are partly crushed between these rolls the juices therefrom dropping within the trough 43 to be finally conveyed to the receptacle 51. The crushed apples from these rolls 11 will be effectively conveyed into the rotary strainer 17 through the instrumentality of the trough 19, and in view of the foraminous nature of this strainer, a further portion of the fruit juices will drop into the trough or hopper 45 and then outwardly therefrom through the nozzle 46 into the said trough 43. The crushed fruit will eventually lead into the hopper 48, to be crushed between the first pair of rollers 20 and thence into the hopper 49 to the second pair of rollers 21, the fruit pulp being finally conveyed onto the endless platform 50, which is carried away from suitable receptacles. By providing each of the rolls with the pivoted rods 39, it will at once be seen that the crushed fruit will be adequately drawn between these rolls in view of the fact that when within the hoppers 48 and 49, these rods are forced outwardly in a manner more clearly shown in Figure 5. Should the fruit juices which finally reach the inclined trough 44 contain any of the fruit pulp, the same will effectively be caught within the pan 52, to be again conveyed rearwardly by the conveyor 53 to be once again crushed between the foremost pair of rollers 21.

In view of the above description, it is believed by me that the advantages of a fruit press of the character shown and described will be readily appreciated by those skilled in the art, and although I have herein shown and described the preferred embodiment of this invention, I nevertheless desire to have it understood that I do not limit myself to what is herein shown, and that minor changes may be made therein, without departing from the spirit and scope of the invention as claimed.

Having thus described my invention, what I claim as new, and desire to secure by Letters Patent is:

1. A fruit press comprising an inclined trough, a plurality of horizontally arranged pressing rollers arranged at the upper end thereof, a series of stepped pans supported above the trough, a discharge spout leading from the upper pan and communicating with the trough, a revoluble screen supported above the upper pan and communicating with the adjacent pan, and pairs of presser rollers supported in the remaining pans.

2. A fruit press comprising an inclined trough, a plurality of horizontally arranged pressing rollers arranged at the upper end thereof, a series of stepped pans supported above the trough, a discharge spout leading from the upper pan and communicating with the trough, a revoluble screen supported above the upper pan and communicating with the adjacent pan, pairs of presser rollers supported in the remaining pans, and yieldable journals for the upper end of the rollers.

In testimony whereof I affix my signature.

PERRY D. PARKS.